United States Patent [19]

Arisi et al.

[11] Patent Number: 4,671,675
[45] Date of Patent: Jun. 9, 1987

[54] TUBULAR ELEMENT INSTRUMENTED WITH TEMPERATURE SENSORS, IN PARTICULAR FOR MEASURING OVERTEMPERATURES IN THE TUBES OF THERMOELECTRIC POWER PLANT SUPERHEATERS

[75] Inventors: Sergio Arisi; Aldo Parmeggiani, both of Milan, Italy

[73] Assignee: Cise-Centro Informazioni Studi Esperienzes, Milan, Italy

[21] Appl. No.: 871,132

[22] Filed: Jun. 2, 1986

Related U.S. Application Data

[63] Continuation of Ser. No. 574,248, Jan. 26, 1984, abandoned.

[30] Foreign Application Priority Data

Jul. 7, 1983 [IT] Italy .............................. 21964 A/83

[51] Int. Cl.[4] .............................................. G01K 1/14
[52] U.S. Cl. .................................... 374/147; 374/208; 136/233; 236/78 B
[58] Field of Search ................ 374/29, 136, 147, 148, 374/135, 208, 210, 4, 110; 136/230, 232, 233; 165/11.1; 138/DIG. 5; 340/584, 596, 605; 236/78 B, DIG. 6, DIG. 12

[56] References Cited

U.S. PATENT DOCUMENTS

| | | | |
|---|---|---|---|
| 1,758,532 | 5/1930 | Phinney | 374/148 |
| 1,945,103 | 1/1934 | Vis | 165/11.1 |
| 2,238,015 | 4/1941 | Doll | 374/208 |
| 2,644,065 | 6/1953 | Peterson | 374/110 |
| 2,703,833 | 3/1955 | Vanvor | 374/185 |
| 3,510,762 | 5/1970 | Leslie | 374/110 |
| 4,023,411 | 5/1977 | Escher | 136/233 |
| 4,054,174 | 10/1977 | Haller | 122/DIG. 13 |
| 4,216,821 | 8/1980 | Robin | 165/11.1 |
| 4,534,662 | 8/1985 | Barlian | 374/4 |
| 4,595,297 | 6/1986 | Liu et al. | 374/29 |

FOREIGN PATENT DOCUMENTS

| | | | |
|---|---|---|---|
| 650788 | 10/1962 | Canada | 165/11 R |
| 1285602 | 1/1962 | France | 374/147 |
| 5106332 | 8/1980 | Japan | 374/4 |

*Primary Examiner*—Allan N. Shoap
*Assistant Examiner*—Thomas B. Will
*Attorney, Agent, or Firm*—Cushman, Darby & Cushman

[57] ABSTRACT

This invention relates to a tubular element provided with a temperature sensor, in particular for measuring overtemperatures in the tube bundle of superheaters in thermoelectric power plant steam generators, comprising a pair of concentric tubes forcibly locked one into the other by a mechanical plastic deformation process, at least one of the two tubes comprising in the mutually contacting surfaces a series of longitudinal grooves into which temperature sensors are inserted.

7 Claims, 3 Drawing Figures

TUBULAR ELEMENT INSTRUMENTED WITH TEMPERATURE SENSORS, IN PARTICULAR FOR MEASURING OVERTEMPERATURES IN THE TUBES OF THERMOELECTRIC POWER PLANT SUPERHEATERS

This is a continuation of application Ser. No. 574,248, filed Jan. 26, 1984, which was abandoned upon the filing hereof.

This invention relates to a tubular element in which temperature sensors are inserted into suitable essentially longitudinal seats provided in the wall of said tubular element.

When suitably disposed, said tubular element specifically enables the temperatures of superheater tube walls to be measured, in order to enable any exceeding of the allowable temperature limits to be immediately checked.

Measuring the wall temperatures of the constituent tubes of a superheater is known to be of particular importance, as said tubes are subjected to large temperature gradients, to aggressive products of combustion, and to high temperatures.

This measurement is currently made using commercial thermocouples mounted on the tube surfaces and/or suitably supported on the outside of the tubes. The aforesaid chemical and physical conditions enable thermocouples mounted in this manner to operate correctly only for periods of a few weeks, such periods being unacceptable and of little significance in the effective control of the plant. There are currently no superheaters which are instrumented or provided with protective systems and alarms which make it possible to act in order to save the tube bundle, in particular during the temperature transients at plant start-up.

The object of the present invention is to provide a device able to make local measurements of the tube wall temperatures to enable any exceeding of the temperature limits tolerable by the superheater to be immediately checked.

This object is attained by a tubular element provided with a temperature sensor, in particular for measuring overtemperatures in the tube bundle of superheaters in thermoelectric power plant steam generators, characterised by comprising a pair of concentric tubes forcibly locked one into the other by a mechanical plastic deformation process, at least one of the two tubes comprising in the mutually contacting surfaces a series of longitudinal grooves into which said temperature sensors are inserted.

The characteristics and advantages of an instrumented tubular element constructed in accordance with the present invention will be more apparent from the description given hereinafter with reference to the accompanying diagrammatic drawings in which.

Figure 1:
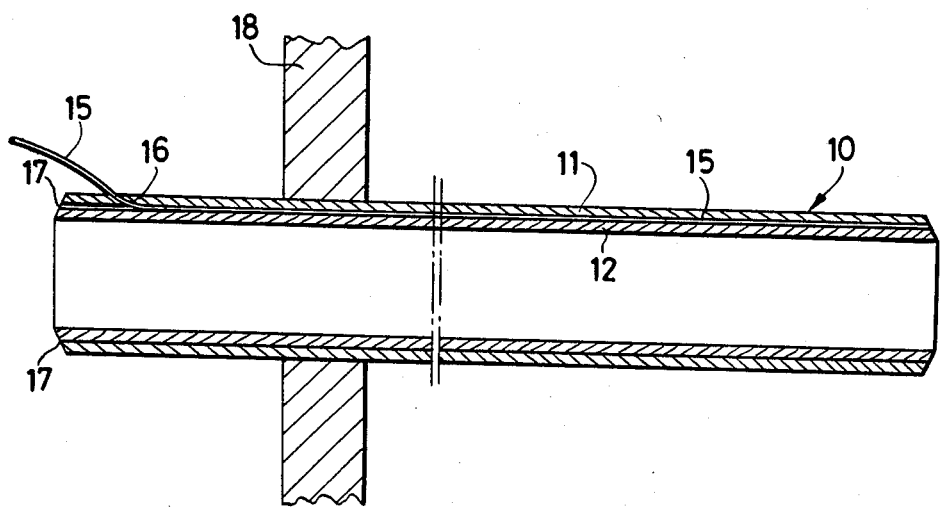
FIG. 1 is a partly broken longitudinal section through an instrumented element according to the invention.
Figure 3:
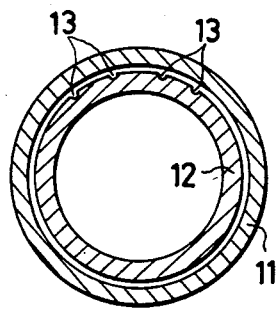
FIG. 3 is a cross-section equivalent to that of FIG. 2, before undergoing a drawing process.
Figure 2:
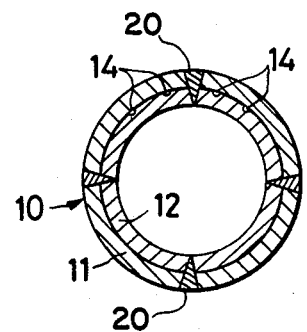
FIG. 2 is a cross-section through an element such as that of FIG. 1.

With reference to the drawings, a tubular element according to the invention indicated by 10 comprises a first tube 11 into which a second tube 12 is concentrically inserted with a gap of a few tenths of a millimeter.

A series of longitudinal grooves 13 are formed in the outer surface of the second tube 12, and have a cross-section of essentially circular profile, obtained for example by milling followed by smoothing or polishing.

The two tubes 11 and 12, inserted one into the other, are subjected to mechanical cold-drawing, effected with an internal mandrel, which forces the two said tubes together to create positioning seats 14 for thermocouples 15.

In the vicinity of an end portion 17 of said tubular element 10 constituted in this manner there are provided arcuate bores or seats 16 which connect the seats 14 to the outside of the tubular element to enable the thermocouples 15 to be connected to measuring systems (not shown). An end portion 17 of the tubular element 10 which is free from thermocouples 15 enables it to be assembled by welding, with the thermocouples 15 already inserted, these latter undergoing no danger of damage and emerging into a zone which is not exposed to the aggressive fluids, and lies beyond a wall 18.

The drawing process carried out with an internal mandrel provides for a tube diameter reduction of 5–10% and a simultaneous analogous thickness reduction so that the two tubes remain strongly forced together to provide good thermal contact. Before being drawn, the contacting surfaces undergo chemical pickling treatment and the surfaces which slide in the draw-bench undergo bonderizing. The state of tension induced by the drawing operation, together with the pressure of the process fluid inside the tubular element, oppose any separation of the two tubes caused by differential expansion in the presence of temperature gradients. In particular, for equal total thicknesses (ie the sum of the two), it is convenient to thin-down the tube exposed to the fluid of higher pressure.

Furthermore, in order to improve thermal contact between the two tubes inserted one into the other, a series of longitudinal welds 20 can be provided in suitable number, made for example by means of an electron beam or a similar method.

We claim:

1. A fluid flow conduit comprising an inner metal tube having a bore defining a fluid flow passage, an outer metal tube concentric with the inner tube, the tubes being locked together by mechanical deformation process such that the outer surface of the inner tube is in tight thermal contact with the inner surface of the outer tube along the length of the tubes, at least one of said surfaces having at least one longitudinal groove therein forming with the other of said surfaces a circumferentially closed longitudinal passage into which an elongated temperature sensor has been inserted in a longitudinal direction for measuring the temperature of the conduit.

2. A fluid flow conduit as in claim 1 wherein the tubes are locked together as a result of a drawing process.

3. A fluid flow conduit as in claim 1 wherein the wall of the outer tube has a generally transverse passage therethrough connecting with said longitudinal passage for introducing the elongated temperature sensor into said longitudinal passage.

4. A heat exchanger conduit comprising: an inner metal tube having a bore defining a fluid passage, an outer metal tube concentric with the inner tube, said tubes being forcibly locked into engagement with each other by a mechanical plastic deformation of the tubes so that the outer surface of the inner tube is in tight thermal contact with the inner surface of the outer tube along the length of the tube, at least one of said surfaces having at least one longitudinal groove therein forming with the other of said surfaces a longitudinal circumferentially closed passage for longitudinally receiving an elongated temperature sensor.

5. A fluid flow conduit as in claim 4 wherein a series of longitudinal welds are provided by an electron beam through the thickness of said concentric tubes in order to improve thermal contact between said tubes.

6. A heat exchanger conduit as in claim 4 wherein near one end of said conduit the wall of the outer tube has a generally transverse passage therethrough connecting with said longitudinal passage for introducing the elongated temperature sensor into said longitudinal passage.

7. In a heat exchanger having an enclosure: a plurality heat exchange conduits extending through the enclosure with a portion of the heat exchange conduits being positioned externally of the enclosure, at least one of the heat exchange conduits comprising inner and outer heat-conducting tubes coaxially arranged and joined together along their lengths by a deformation process thereby forming a thermal contact area between the outer surface of the inner tube and the inner surface of the outer tube and extending the length of the tubes, at least one of said surfaces having at least one longitudinal groove along the contact area forming with the other of said surfaces a longitudinal circumferentially closed passage for longitudinally receiving a temperature sensor, and the wall of the outer tube, at a location outside the enclosure, having a generally transverse passage therethrough connecting with said longitudinal passage.

* * * * *